H. A. BAILEY, dec'd, & A. R. BURDICK.

Assignors to W. H. FIELD.

Horse Hay-Rakes.

No. 7,968. Reissued Nov. 27, 1877.

Witnesses.
Grenville Lewis
M. Church

Inventors.
H. A. Bailey
A. R. Burdick
By Hill, Ellsworth & Spear
Their Attys.

N. PETERS, PHOTO-LITHOGRAPHER, WASHINGTON, D. C.

UNITED STATES PATENT OFFICE.

LESTINA BAILEY (WIDOW OF H. A. BAILEY) AND A. R. BURDICK, OF RACINE, WISCONSIN, ASSIGNORS TO WM. H. FIELD, OF PORT CHESTER, N. Y.

IMPROVEMENT IN HORSE HAY-RAKES.

Specification forming part of Letters Patent No. 55,804, dated June 26, 1866; Reissue No. 7,968, dated November 27, 1877; application filed December 5, 1876.

*To all whom it may concern:*

Be it known that H. A. BAILEY and A. R. BURDICK, of Racine, Racine county, State of Wisconsin, did invent a new and Improved Horse-Rake, of which the following is a full, clear, and exact description thereof, which will enable others skilled in the art to make and use the same, reference being had to the accompanying drawings, forming part of this specification, in which—

Figure 1:
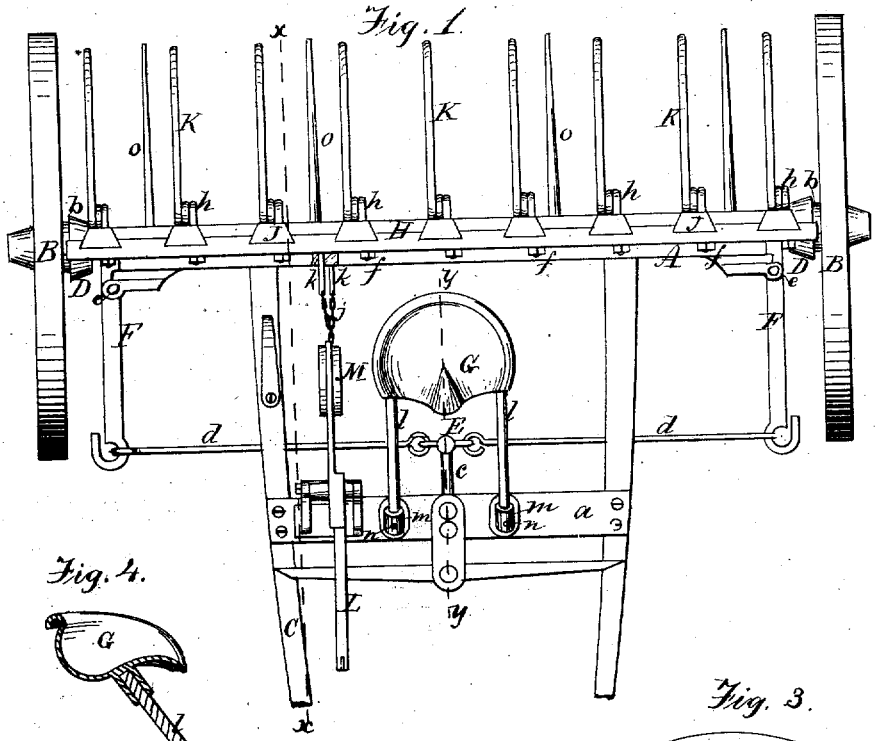
Figure 4:
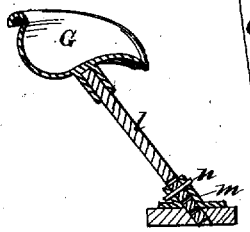
Figure 3:
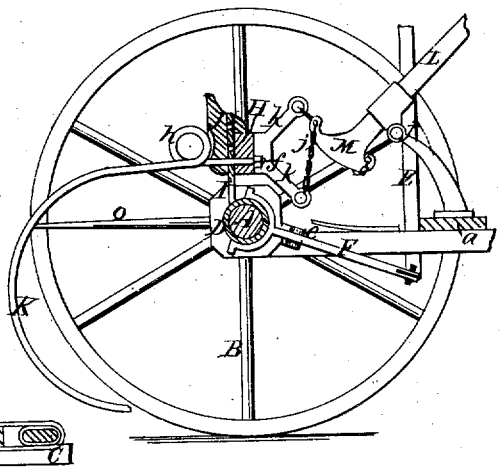
Figure 2:
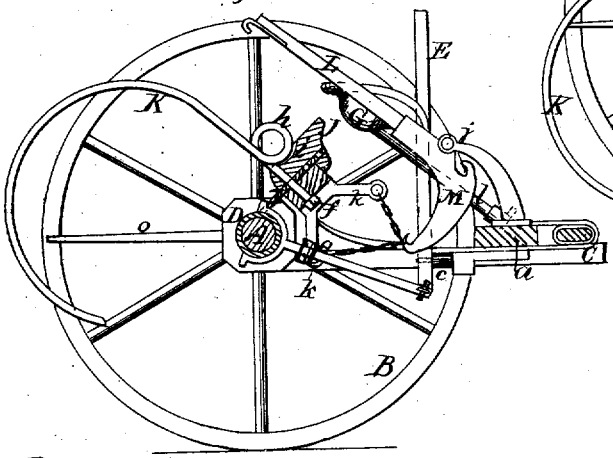

Figure 1 is a plan or top view of the invention; Figs. 2 and 3, side sectional views of the same, taken in the same line, *x x*, Fig. 1; Fig. 4, a section of the driver's seat, taken in the line *y y*, Fig. 1.

Similar letters of reference indicate like parts.

Heretofore, so far as we are aware, in horse hay-rakes in which the teeth are raised by frictional contact with the revolving parts of the machine, such friction has been applied on one side only of such revolving part. This is objectionable, especially for two reasons: first, because of the amount of play usually necessary in such machines, which necessitates a large amount of motion in the lever by which the friction is applied; and, second, because, by reason of the constant wear, the amount of such motion is constantly changing. Further, when the pressure is only one way, the revolving portion is constantly pressed out of place, and the whole action tends to disarrange the parts.

This invention, therefore, consists, primarily, in applying the pressure to the revolving part of the machine, so that the said pressure, acting mainly on opposite surfaces and against itself, shall in some sense clamp such parts and tend to hold them from rotating without any lateral displacement, or tendency to displacement, of any practical importance.

It consists, also, of certain details of construction, which will be fully described and made the subject of specific claims.

A represents an axle, the wheels B B of which are placed loosely upon it. C C are thills attached to the axle, said thills being connected by a cross-bar, *a*. D D represent conical friction-clutches, which are fitted loosely on the axle A, so as to slide thereon longitudinally, or to partially turn with the hub. The conical clutches, when moved outward or toward the wheels B B, fit and bind over the inner conical parts of the hubs *b b* of the wheels, so that the said clutches will be locked to the hubs by frictional contact, and will turn with them. These clutches are moved so as to engage with the hubs, or be free therefrom, by means of a lever, E, which has its fulcrum *c* attached to the cross-bar *a* of the thills, and is connected by rods *d d* to the outer ends of levers F F, the fulcra *l* of which are attached to the axle A. The inner ends of the levers F are forked and fitted over the clutches D D. The lever E is within convenient reach of the driver on his seat G, so that the driver can at will cause the clutches D to engage with the hubs of the wheels, or, by reverse movement, disconnect the clutches from said hubs.

As in all cone-clutches, the amount of motion required to bring the parts into contact is very slight, as also is the amount of endwise pressure. The latter is not enough to cause any serious outward pressure on the hub, the larger percentage acting radially upon the hub to clamp the same and hold it from revolving.

H represents the rake-head, which is connected to arms I I on the clutches D D. These arms I I pass through those of the metal heads J, which are on the ends of the rake-head H. All of said heads J are secured to the rake-head by means of the rake-teeth K, the upper ends of which pass through them, through any of a series of perforations in the arms I, and through the rake-head, the ends of the teeth being secured by nuts *f*. The heads J have lips *g* on them, which rest on the upper surface of the rake-head.

From the above description it will be seen that the rake-head may be raised or lowered by passing the upper end of the rake-teeth through different holes in the arms I I. (See Figs. 2 and 3.) The upper parts of the rake-teeth are formed with one or more convolutions, *h*, which fit in grooves *i* in the outer surfaces of the heads J. All of the rake-teeth are secured to the rake-head in this manner, the arms I I, of course, passing through the outermost heads J only at the end of the rake-head. The rake-teeth, by this arrangement, are firmly secured in position, and may be readily attached or detached for repairs, or for the substitution of new teeth when required.

L is a lever, which has its fulcrum *j* attached to the cross-bar *a* of the thills C C. This lever has an eccentric-segment, M, on its lower end, and the ends of this segment are connected by cross-chains *j j* to arms *k k*, secured to the front side of the rake-head. This lever L is within convenient reach of the driver on his seat G, and, by drawing the upper end of the lever L backward, the rake H will be elevated or raised, as shown in Fig. 2, and the rake kept down to its work by pressing forward said lever L.

In order to temporarily raise the rake, that it may discharge its load, the driver actuates the lever E, to engage the clutches D D with the hubs of the wheels, and thereby causes the rake to be elevated, the rake dropping down to its work by virtue of its own gravity as soon as the clutches are drawn back from the hubs of the wheels.

The driver's seat G rests upon two supports, *l l*, the lower ends of which pass through metal sockets *m m*, attached to the cross-bar *a*, and through holes in said cross-bar, pins *n* passing through the sockets and supports. By this arrangement the seat may be adjusted higher or lower, as desired. (See Fig. 4.)

The axle A has arms *o* projecting from its rear side, to prevent the hay rising with the rake.

Having thus described the invention, what is claimed as new, and desired to be secured by Letters Patent, is—

1. In a horse hay-rake, the combination of a revolving traction-wheel and partially-revolving rake-head with a friction-brake arranged to gripe around the revolving hubs of the wheel, or equivalent part, and with mechanism for applying and releasing said brake to dump the load at the will of the operator.

2. An apparatus for connecting the teeth of a horse hay-rake to the revolving parts, said apparatus consisting of a cone-clutch, one part of which is connected to the revolving part and the other to the teeth, as set forth.

3. The metal heads J, provided with lips *g* and grooves *i*, and retained on the rake-head by the upper end of the rake-teeth K, passing through them and the rake-head, substantially as and for the purposes herein set forth.

4. The rake-head H, attached to clutches D D, fitted loosely on the axle A, and operated by means of levers by the driver from his seat G, for the purpose of automatically raising the rake to discharge its load, substantially as shown and described.

Witness my hand and seal this 10th day of July, 1876, in the matter of application for a reissue of Letters Patent in horse hay-rakes, dated June 26, 1866.

A. R. BURDICK. [L. S.]
WILLIAM H. FIELD, *Assignee.*

Witnesses as to Burdick:
ROBT. B. BRADLEY,
CHARLES ROBINSON.

Witnesses as to Field:
WILLIAM J. LANE,
FRANK MCKENNEY.